(No Model.)
J. E. LOW & M. DAHL.
TOOL HOLDER.
No. 491,317. Patented Feb. 7, 1893.
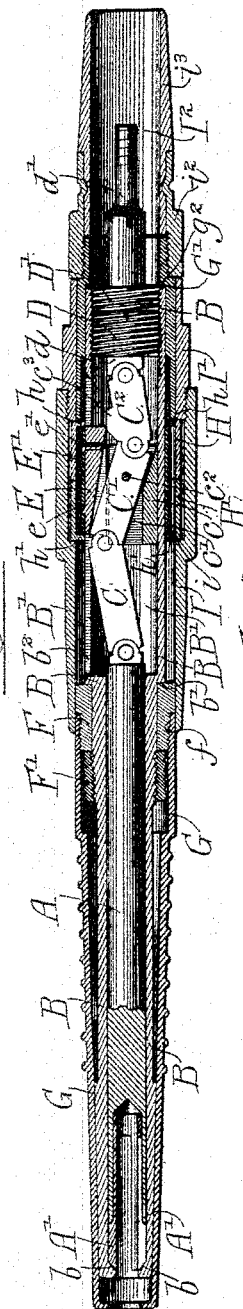
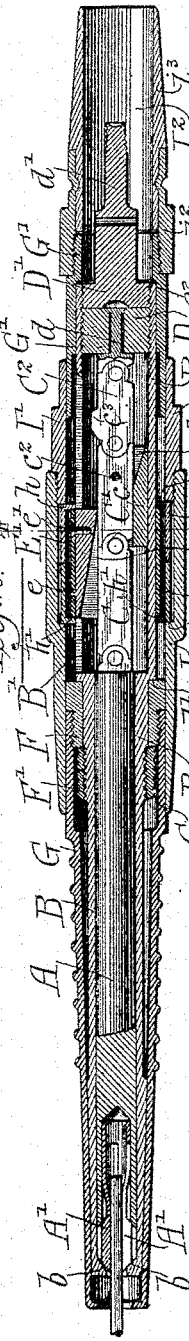
Witnesses:
Wm M. Rheem
Louis M. F. Whitehead
Inventors.
James E. Low &
Magnus Dahl.
By Dayton, Poole + Brown
Atty's.

UNITED STATES PATENT OFFICE.

JAMES E. LOW AND MAGNUS DAHL, OF CHICAGO, ILLINOIS; SAID DAHL ASSIGNOR TO SAID LOW.

TOOL-HOLDER.

SPECIFICATION forming part of Letters Patent No. 491,317, dated February 7, 1893.

Application filed October 1, 1891. Serial No. 407,425. (No model.)

*To all whom it may concern:*

Be it known that we, JAMES E. LOW and MAGNUS DAHL, of Chicago, in the county of Cook and State of Illinois, have invented certain new and useful Improvements in Tool-Holders; and we do hereby declare that the following is a full, clear, and exact description thereof, reference being had to the accompanying drawings, and to the letters of reference marked thereon, which form a part of this specification.

The object of this invention is to improve the construction and operation of that class of rotating tool-holders or chucks in which a toggle is employed as a means for giving a longitudinal movement to one of the parts of the chuck with respect to the other, such, for instance, as is described in prior application for United States Letters Patent filed by us September 22, 1890, Serial No. 365,794.

To this end the invention consists in the matters hereinafter described and set forth in the appended claims.

In the accompanying drawings: Figure 1 is a longitudinal section of a tool holder embodying our improvements, the parts being shown in position to distend the jaws of the chuck to receive the shank of a tool. Fig. 2 is a similar view, showing parts in position to close the jaws of the chuck to grasp a tool. Fig. 3 is a similar section, taken in a plane at right angles to the section shown in Fig. 2. Fig. 4 is a transverse section of the tool holder, taken on the line 4—4 of Fig. 2. Fig. 5 is a sectional detail, illustrating certain details of construction. Fig. 6 is an elevation of the journal sleeve. Fig. 7 is an end elevation of the two-part flanged sleeve connecting the sliding casing with the toggle operating devices.

For convenience of illustration and description we have shown our improved tool holder adapted to the hand piece of a dental engine, in which a longitudinally movable spindle A. is fitted at the outer end with spring jaws A′, the outer surfaces of which are beveled to engage or ride upon the inwardly beveled surface or surfaces $b$ carried by or forming part of a longitudinally fixed tube B in which the spindle A is supported. This tube is, at about its mid-length, enlarged to form a chamber B′, affording space for the reception and operation of a series of links C, C′, and $C^2$ connected by rule joints to form a toggle. The first one C of these links is connected to the inner end of the spindle A by a rule joint, while the last link $C^2$, is connected by a similar joint to a swivel bolt $d$ seated loosely in a screw plug D, the thread of which engages a female thread in the inner end of the tube B, thus admitting of the longitudinal adjustment of the screw plug with its connected parts, *i. e.* the toggle and the spindle A, should this become necessary from the wearing of the beveled surfaces of the chuck or clutch members, or for other reasons.

A block $c$ is seated in the chamber B′ of the tube B, to which the link C′ is pivoted by means of a fulcrum pin $c^2$. The rear or outer edge of said block is curved transversely to fit the wall of the chamber, and in the other or inner face of the block is a groove or channel $c'$, to receive the said link; the bottom of the groove, at one end of the block being inclined to admit of the movement of the link C′ within the channel. The bottom of this channel $c'$ at the outer end of the block is only of such depth as to support the outer end of the link C′ centrally within the chamber B′.

At the point where the diameter of the tube B is increased to provide the chamber B′, an annular offset or shoulder $b'$ is formed, that part of the tube forming the walls of the chamber B′ being provided with a longitudinal slot $b^2$, extending from this shoulder to the thread cut in its inner end. In this slot is seated a wedge shaped block or presser E, the outer curved edge of which is secured to a sliding sleeve E′, which encircles the tube B, by means of a stud $e$ projecting from one end of the block and engaging an opening in the sleeve E′, and a screw $e'$ passing through the other end of said sleeve and engaging a tapped hole in the end of the block.

Within the inner threaded end of the tube B is seated another screw plug D′ provided with a stem $d'$ to receive the end of a flexible shaft (not shown) or other usual means for connecting the tool holder with a dental engine or other motor, this plug D′ serving the further purpose of locking the screw plug D in position after adjustment.

The parts so far described constitute the rotating parts of the tool holder, which are contained in a non-rotating case now to be described.

F is a sleeve mounted on the tube B to bear against the shoulder $b'$ said sleeve being confined between this shoulder and a milled ring F′ which is threaded interiorly to engage threads cut on the exterior of the tube, the sleeve F thus serving as a box in which the tube is journaled at this point. The outer end of this journal sleeve is provided with a male thread $f$ which engages a corresponding female thread formed in the inner end of a tip G the outer end of which is tapered to fit snugly over the outer tapered surface of the tube B, thus affording a bearing for the tube at its outer end. The inner end of the screw $f$ terminates in a shoulder against which abuts the inner end of the tip G; the inner end of the journal sleeve F, above the shoulder being of the same diameter as said inner end of the tip G, but provided at its opposite sides with chambers $f^2$ to receive the ends of two flat steel legs $g'$ projecting from a forked sleeve G′ seated on the inner end of the tube B. This forked sleeve G′ is provided interiorly with a shoulder $g^2$ which, when the parts are in position, rests upon the inner end of the tube B, and the ends of the legs $g'$ are provided with inturned lugs $g^3$ which, engaging depressions $f^3$ formed in chambers $f^2$ of sleeve F lock said journal sleeve, and the sleeve G′ against longitudinal movement with respect to each other and constitute in effect a longitudinally slotted sleeve.

In order to insure the positive engagement of the inturned ends $g^3$ of the legs $g'$ with the depressions $f^3$ of sleeve F, we prefer to bevel said shoulder $f'$ and the ends of the legs, to fit or be received within a corresponding bevel or undercut in the end of the tip G.

Encircling the sleeve E′, and the legs $g'$ of the forked sleeve G′, are two rings H, H′ forming a two-part sleeve, provided at opposite sides of its ends with inturned flanges or lips $h, h'$ arranged to pass through the slots formed by the legs $g'$ of the sleeve G′ and engage the ends of the sleeve E′ (Figs. 2, 4 and 7). An outer cylinder I, incloses the inner end of the tip G, the ring F, and the ends of the legs $g'$, and is provided with an interior annular shoulder $i$ which abuts against the end of the ring H′, of the two-part sleeve, a shorter cylinder I′ being screwed into the end cylinder I and abutting with its end against the end of the ring H of the two-part sleeve thereby forming a sliding sheath having an annular recess for the reception of the two-part sleeve, the flanges or lips of which engage the opposite ends of the sliding sleeve E′ to which the presser block is connected. The inner end of the tip G is provided with a stud or spur $g^4$ adapted to engage a longitudinal groove $i'$ extending from the shoulder $i$, in the interior of the cylinder I forming the main part of the sheath, to the end of the said cylinder, thus locking these parts securely against rotation with respect to each other, though permitting the sheath to slide longitudinally. The inner end of the non-rotating case terminates in a tubular cap $I^2$ consisting of a threaded ferrule $i^2$ fitting the threaded end of the forked sleeve G′, and a thimble $i^3$ secured rotatively within said ferrule by spinning or in other well known ways.

It will be seen from the foregoing that so far as devices for giving a longitudinal movement are concerned, the cylinders I and I′ constituting the sheath, the collars H and H′ constituting the two-part ring, the sliding collar E and its presser block, will move as one piece, an adjustment of the sheath resulting, through the engagement of the presser block with the cam piece $c^3$ on the link $C^2$, to positively flex the toggle, and consequently retract the spindle A and open the jaws of the clutch. By sliding the movable sheath in the opposite direction, the end of the presser block E will be first removed from the cam piece $c^3$, and then, acting on the side of the link C′ will move the link on its fulcrum $c^2$, thus straightening the toggle and moving the spindle A outward to close the jaws of the clutch in a manner well understood. Hence, sliding the movable part of the case in either direction results in either the positive flexing or straightening of the toggle, thereby attaining great certainty in the operation of the clutch to grasp or release the shank of the tool. In the particular form of toggle links C′ and $C^2$ and the presser E illustrated, the presser has a longitudinal movement exceeding the distance between the cam piece $c^3$ and the fulcrum $c^2$, for obvious reasons.

It will be understood that devices other than the longitudinally movable block $c$, may be used to permit the necessary slight longitudinal movement of the pivoted link C′ of the toggle, as for instance, this link may be slotted longitudinally and the fulcrum pin $c^2$ be passed through said slot and secured at its ends in the opposite walls of the chamber B′ of the tubular rotating member of the clutch.

What we claim is:—

1. The combination with the relatively fixed and longitudinally movable members of a clutch, and a toggle connecting said members, of an actuating device acting positively upon the toggle both in flexing and straightening the same, substantially as described.

2. The combination with the relatively fixed and longitudinally movable members of a clutch, and a toggle connecting said members, one link of which is fulcrumed in one of said clutch members, of an actuating device acting positively upon the toggle both in flexing and straightening the same, substantially as described.

3. The combination with the relatively fixed and longitudinally movable members of a clutch, of a toggle fulcrumed in one of said members, one of the links of said toggle being provided with a projection, and a longitudinally movable presser acting upon the projection on the toggle, substantially as described.

4. The combination with the relatively fixed and longitudinally movable members of a clutch, of a block having longitudinal movement in the fixed member, a toggle connecting the members of the clutch and having one of its links fulcrumed in the longitudinally movable block, and means acting on the toggle to shift the fulcrumed link on its fulcrum, substantially as described.

5. The combination of a casing embodying a movable sheath, a rotating part contained therein carrying the fixed and movable members of a clutch, a toggle controlling the position of said movable member, and means connected with the movable sheath and imparting positive movement to the toggle in flexing and straightening the same, substantially as described.

6. The combination of a casing, a rotating part therein carrying the fixed and movable members of a clutch, a toggle one link or member of which is fulcrumed in said rotating part for controlling the position of said movable member, and means connected with the casing for moving the toggle in both directions on its fulcrum to flex and straighten the same, substantially as described.

7. The combination of a casing embodying a longitudinally sliding sheath, a rotating part therein carrying the fixed and movable members of a clutch, a toggle controlling the position of said movable member, and means connected with the sliding sheath of the casing imparting positive movement to the toggle to flex and straighten the same, substantially as described.

8. The combination of a casing embodying a movable sheath, a rotating part therein carrying the fixed and movable members of a clutch, a toggle one part or link of which is fulcrumed in said rotating part, for controlling the position of the said movable member, and a presser connected with the movable sheath and imparting positive movement to the toggle to flex and straigthten the same, substantially as described.

9. The combination of a casing embodying a movable sheath, a rotating part therein carrying the fixed and movable members of a clutch, a toggle one of the links of which is fulcrumed in said rotating part and one of the links of which is provided with a projection, and means connected with the movable sheath of the casing and acting upon said projection on the toggle link, substantially as described.

10. The combination of a casing embodying a movable sheath, a rotating part therein carrying the fixed and movable members of a clutch, a toggle fulcrumed in said rotating part and connected with said movable members, one of the links of said toggle being provided with a projection, and a presser attached to the movable sheath and adapted to shift the fulcrumed link on its pivotal center, substantially as described.

11. The combination of a casing embodying a movable sheath, a rotating tubular part contained therein carrying the fixed and movable members of a clutch, a toggle connected with the members of the clutch, a block located within the tubular part in which block one of the links of the toggle is fulcrumed, and a presser connected with the said sheath and acting upon the toggle, substantially as described.

12. The combination of a casing embodying a movable sheath, a rotating tubular part contained therein carrying the fixed and movable members of a clutch, a longitudinally movable block seated in said tubular part, a toggle connected with the members of the clutch and having one of its links pivoted to the guide block, and a presser connected with the said sheath and acting upon the toggle, substantially as described.

13. The combination of a casing embodying a movable sheath, a rotating part contained therein carrying the fixed and movable members of a clutch, a toggle connected at one end with the movable part of the clutch and at its other end connected adjustably with the fixed part of the clutch, means connected with the sheath giving positive movement to the toggle for flexing and straightening the same, and a stem which affords connection with a motor and locks the adjustable end of the toggle, substantially as described.

14. The combination of a casing embracing a longitudinally slotted sleeve and a movable sheath sliding thereon, a tubular part rotating in the casing carrying the fixed and movable members of a clutch, a toggle connected at its ends with said fixed and movable members, a sliding sleeve upon said tubular part and within the longitudinally slotted sleeve of the casing, a presser seated in a longitudinal slot in said tubular part and acting on the toggle, said presser being attached to said sliding sleeve, and means extending through the slots of the longitudinally slotted sleeve of the casing for connecting the sleeve with the movable sheath, substantially as described.

15. The combination of a casing embodying a movable sheath, a rotating part therein carrying the fixed and movable members of a clutch, a toggle fulcrumed in said rotating part and having a projection on one of its links, and a presser connected with the movable sheath and having a longitudinal movement exceeding the distance between said fulcrum and projection, substantially as described.

16. The combination with a revoluble tube carrying clutch members and their operating devices and having an encircling sliding sleeve carrying means for actuating said clutch operating devices, of a non-rotating casing consisting of a tip, a longitudinally slotted part which embraces the sliding sleeve and is connected with the tip, a two-part sleeve embracing said slotted part and provided with flanges extending through the slots of the said slotted part of the casing to engage the ends of the sliding sleeve, and a sliding sheath provided interiorly with an annular recess to receive said two-part sleeve, substantially as described.

17. The combination with the revoluble clutch-carrying tube and its encircling sliding sleeve, of a journal sleeve mounted on the tube, a tip secured to said journal sleeve, a forked sleeve the forks of which embrace the sliding sleeve and are at their ends secured to said journal sleeve, a two-part sleeve embracing said forks and provided with flanges which extend through the slots formed by the forks to engage the ends of the sliding sleeve, and a sliding sheath provided interiorly with an annular recess to receive the two-part sleeve, substantially as described.

In testimony that we claim the foregoing as our invention we affix our signatures in presence of two witnesses.

JAMES E. LOW.
MAGNUS DAHL.

Witnesses:
C. CLARENCE POOLE,
TAYLOR E. BROWN.